United States Patent
Alber et al.

(10) Patent No.: US 8,876,057 B2
(45) Date of Patent: Nov. 4, 2014

(54) AERODYNAMIC INTEGRATION OF A PAYLOAD CONTAINER WITH A VERTICAL TAKE-OFF AND LANDING AIRCRAFT

(75) Inventors: Mark R. Alber, Milford, CT (US); Brandon L. Stille, Cheshire, CT (US); Alfred Russell Smiley, Marlborough, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 658 days.

(21) Appl. No.: 12/373,537

(22) PCT Filed: Jul. 19, 2007

(86) PCT No.: PCT/US2007/073846
§ 371 (c)(1),
(2), (4) Date: Jan. 13, 2009

(87) PCT Pub. No.: WO2008/085547
PCT Pub. Date: Jul. 17, 2008

(65) Prior Publication Data
US 2010/0012769 A1  Jan. 21, 2010

Related U.S. Application Data

(60) Provisional application No. 60/834,104, filed on Jul. 27, 2006.

(51) Int. Cl.
*B64C 1/22* (2006.01)
(52) U.S. Cl.
USPC ................................. 244/137.1; 244/172.3

(58) Field of Classification Search
USPC .......... 244/6, 7 R, 137.1, 137.4, 17.11, 17.23
See application file for complete search history.

(56) References Cited

U.S. PATENT DOCUMENTS

| | | | | |
|---|---|---|---|---|
| D153,314 S | * | 4/1949 | Piasecki | D12/329 |
| 2,472,947 A | * | 6/1949 | Hlobil | 244/118.1 |
| 2,557,962 A | | 6/1951 | Greene | |
| 2,577,287 A | | 12/1951 | Sullivan | |
| 2,998,948 A | * | 9/1961 | Sisk | 244/137.1 |
| 3,156,434 A | * | 11/1964 | Harrington | 244/7 R |
| 3,361,396 A | * | 1/1968 | Reno | 244/118.2 |
| 3,366,347 A | * | 1/1968 | Soulez-Lariviere | 244/23 R |
| 3,510,107 A | | 5/1970 | Fidler | |
| 3,605,935 A | | 9/1971 | Gilbert | |
| 4,296,892 A | | 10/1981 | Barge | |
| 6,056,237 A | | 5/2000 | Woodland | |
| 6,082,667 A | | 7/2000 | Haggard | |
| 6,113,037 A | | 9/2000 | Pace | |

(Continued)

OTHER PUBLICATIONS

PCT International Search Report and written opinion mailed Aug. 27, 2008.

(Continued)

*Primary Examiner* — Brian M O'Hara
(74) *Attorney, Agent, or Firm* — Carlson, Gaskey & Olds, P.C.

(57) ABSTRACT

A vertical takeoff and landing (VTOL) rotary-wing air-craft is sized and configured to match a payload container such as a standardized Joint Modular Intermodal Container (JMIC). The aircraft may be an Unmanned Air Vehicle (UAV) that is capable of autonomously engaging and disengaging the container so that the aircraft can pick up and drop off the JMIC with minimum human intervention.

34 Claims, 12 Drawing Sheets

(56) References Cited

U.S. PATENT DOCUMENTS

| | | | |
|---|---|---|---|
| 6,116,606 A | 9/2000 | Brum et al. | |
| 6,176,451 B1 | 1/2001 | Drymon | |
| 6,234,422 B1 * | 5/2001 | Bolonkin | 244/6 |
| 6,260,797 B1 | 7/2001 | Palmer | |
| 6,286,410 B1 | 9/2001 | Leibolt | |
| 6,377,875 B1 | 4/2002 | Schwaerzler | |
| 6,392,213 B1 | 5/2002 | Martorana et al. | |
| 6,409,122 B1 | 6/2002 | Nicolai | |
| 6,471,160 B2 | 10/2002 | Grieser | |
| 6,587,762 B1 | 7/2003 | Rooney | |
| 6,607,162 B2 | 8/2003 | Warsop et al. | |
| 6,626,398 B1 | 9/2003 | Cox et al. | |
| 6,640,739 B2 | 11/2003 | Woodall et al. | |
| 6,665,594 B1 | 12/2003 | Armstrong | |
| 6,666,409 B2 | 12/2003 | Carpenter et al. | |
| 6,694,228 B2 | 2/2004 | Rios | |
| 6,742,741 B1 | 6/2004 | Rivoli | |
| 6,751,530 B2 | 6/2004 | Seifert et al. | |
| 6,792,363 B1 | 9/2004 | Bye | |
| 6,817,573 B2 | 11/2004 | Harrison et al. | |
| 6,845,939 B1 * | 1/2005 | Baldwin | 244/7 R |
| 6,853,875 B1 | 2/2005 | Moritz et al. | |
| 6,856,894 B1 | 2/2005 | Bodin et al. | |
| 6,868,314 B1 | 3/2005 | Frink | |
| 6,869,042 B2 | 3/2005 | Harrison | |
| 6,874,729 B1 | 4/2005 | McDonnell | |
| 7,059,566 B2 | 6/2006 | Byers et al. | |
| 2002/0104923 A1 | 8/2002 | Warsop et al. | |
| 2003/0001045 A1 | 1/2003 | Yifrach | |
| 2005/0006525 A1 | 1/2005 | Byers et al. | |
| 2005/0017129 A1 | 1/2005 | McDonnell | |
| 2005/0109259 A1 | 5/2005 | August | |
| 2005/0134496 A1 | 6/2005 | Trainor | |
| 2006/0192046 A1 * | 8/2006 | Heath et al. | 244/12.3 |

OTHER PUBLICATIONS

Supplementary European Search Report for European Patent Application No. 07872257.6 dated Mar. 7, 2013.

* cited by examiner

AERODYNAMIC INTEGRATION OF A PAYLOAD CONTAINER WITH A VERTICAL TAKE-OFF AND LANDING AIRCRAFT

The present application claims priority to U.S. Provisional Patent Application Ser. No. 60/834,104, filed Jul. 27, 2006.

BACKGROUND OF THE INVENTION

The present invention relates to an aircraft sized and configured to transport a payload container, and more specifically to a Vertical Take-off and Landing (VTOL) unmanned air vehicle (UAV) that is aerodynamically and structurally designed around a standardized container such as a Joint Modular Intermodal Container (JMIC) to facilitate autonomous pickup, transport, and drop-off of the container.

Future military forces require enhanced vertical lift capabilities in a compact package to transport payloads into hostile environments.

Internal load operations provide secure aerodynamic carriage of payloads. However, as advantageous as internal load operations may be, such operations may be relatively time consuming and complicated to execute. One such complication may be the relatively small clearances associated with onloading and offloading cargo over a cargo ramp and into the aircraft internal cargo bay. Internal load operations typically require personnel to operate as spotters who communicate with vehicle drivers or ground based equipment operators such as forklift drivers to facilitate position of cargo within the aircraft cargo bay.

External load operations provide a rapid procedure to load, transport, and unload cargo. One or more lines having cargo hooks at an end thereof, or a set of slings, are used to attach the cargo to the aircraft for transportation. However, as advantageous as external operations may be, external operations may also be relatively complicated and time consuming to execute. One such complication is cargo hook positioning. The process of attaching and detaching the cargo hooks to a load generally requires an aircrew member to visually observe the payload and direct a pilot via an intercom system. Although effective, this process may be relatively time consuming and may be hampered by the time lag between communication of aircraft current position and pilot reaction.

Accordingly, it is desirable to provide a Vertical Take-off and Landing (VTOL) aircraft that is aerodynamically and structurally designed around a standardized container to facilitate transport thereof.

SUMMARY OF THE INVENTION

The vertical takeoff and landing (VTOL) rotary-wing aircraft according to the present invention is sized and configured to match a payload container such as a standardized Joint Modular Intermodal Container (JMIC). The aircraft may be an Unmanned Air Vehicle (UAV) that is capable of autonomously engaging and disengaging the payload container with minimal or no human intervention.

The airframe defines a cargo tunnel along the longitudinal axis. The cargo tunnel provides an open forward cargo tunnel section which opens through a forward section of the airframe. The cargo tunnel provides an external conformal interface which is sized to receive the payload container. The tunnel surface is defined in part by a respective port sponson and starboard sponson which are aerodynamically contoured to receive an external fuel tank.

The port sponson and starboard sponson contain a retractable main landing gear system while a tail section includes a fixed tail gear. The retractable main landing gear system retracts forward to selectively position the airframe and the cargo tunnel relative to the payload container for attachment thereto. Forward retraction of the retractable main landing gear system also allows the aircraft to squat for transport within a compact cubic space.

The aircraft also incorporates a moveable aerodynamic structure which provides an aerodynamic interface between the cargo tunnel and the payload container.

The present invention therefore provides a Vertical Take-off and Landing (VTOL) aircraft that is aerodynamically and structurally designed around a standardized container to facilitate transport thereof.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1A:
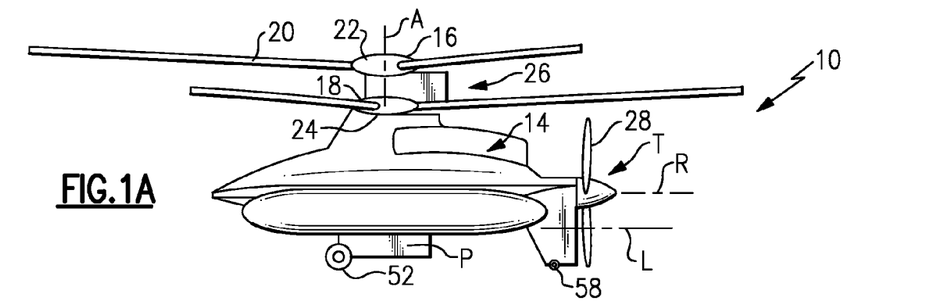
FIG. 1A is a side perspective view of a VTOL UAV with a payload container attached.
Figure 1B:
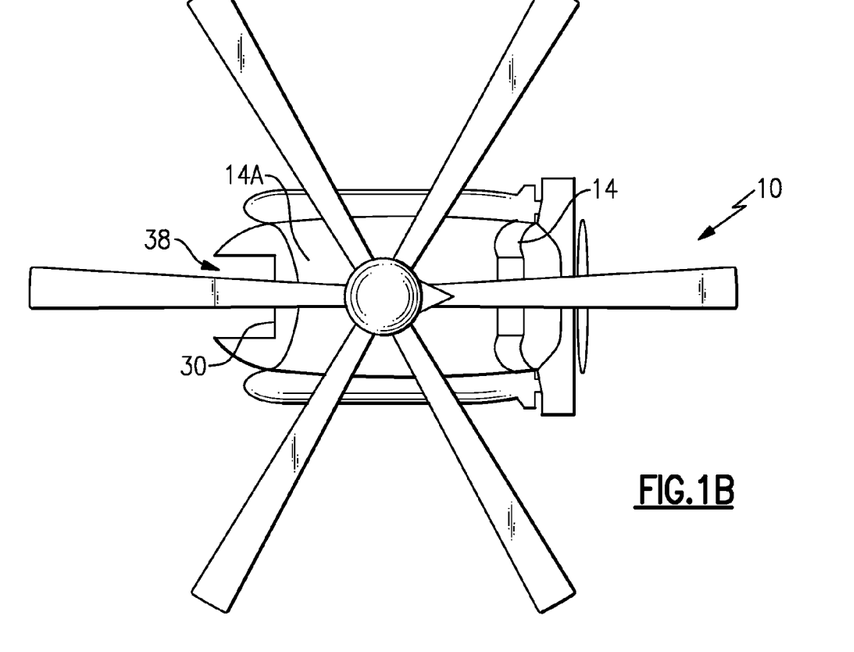
FIG. 1B is a top perspective view of a VTOL UAV with a payload container attached.
Figure 1C:
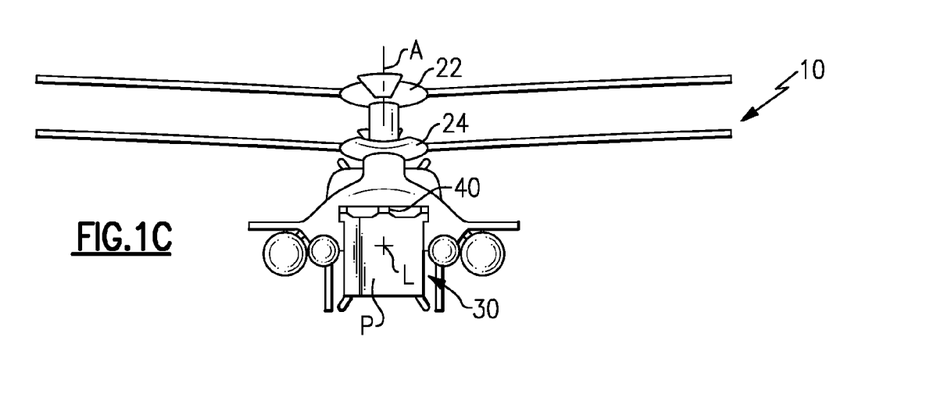
FIG. 1C is a front perspective view of a VTOL UAV with a payload container attached.

FIG. 1A-1C illustrates an exemplary unmanned vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as a propulsive system T which provides translational thrust generally parallel to an aircraft longitudinal axis L. Although a particular high-speed VTOL Unmanned Aerial Vehicle (UAV) configuration is illustrated and described in the disclosed embodiment, other manned and unmanned configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

The dual, counter-rotating, coaxial rotor system 12 includes an upper rotor system 16 and a lower rotor system 18. Each rotor system 16, 18 includes a plurality of rotor blade assemblies 20 mounted to each of an upper rotor hub assembly 22 and a lower rotor hub assembly 24 for rotation about the rotor axis of rotation A. It should be understood that any number of rotor blade assemblies 20 may be mounted to each rotor hub assembly 22, 24. The rotor system 12 preferably includes a rotor hub fairing system 26 for the upper and lower rotor systems 16, 18 such that the rotor hub assemblies 22, 24 are at least partially contained therein.

The propulsive system T may include a pusher propeller 28 having a propeller rotational axis R oriented substantially horizontal and along the aircraft longitudinal axis L to provide thrust for high-speed flight.

Figure 2:
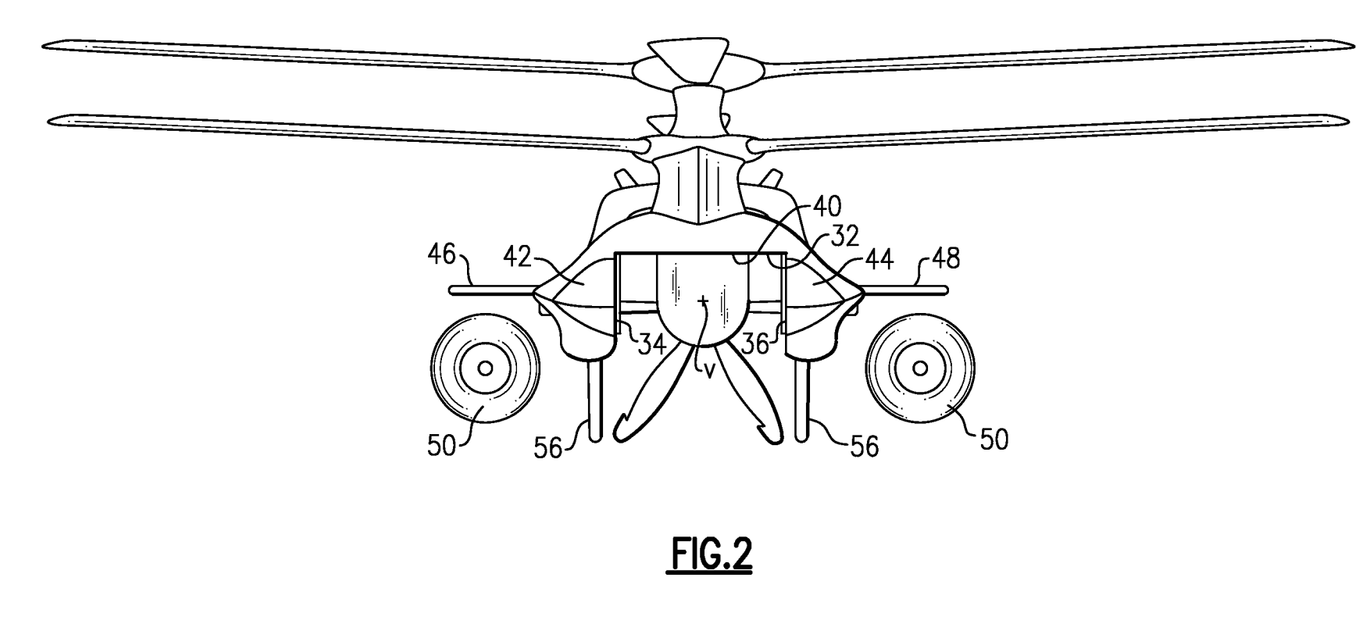
FIG. 2 is a front perspective view of a VTOL UAV illustrating a cargo tunnel without a payload container.

The airframe 14 defines a cargo tunnel 30 (best seen in FIGS. 1C and 2) along the longitudinal axis L. The cargo tunnel 30 includes a first tunnel surface 32, a second tunnel surface 34 transverse to the first tunnel surface 32 and a third tunnel surface 36 transverse to the first tunnel surface 32 (FIG. 2). The cargo tunnel 30 provides an open forward cargo tunnel section 38 which opens through a forward section 14A of the airframe 14. Although the disclosed embodiment of the cargo tunnel 30 is generally rectilinear in lateral cross-section other shapes designed around a particular container may also be provided.

Figure 3A:
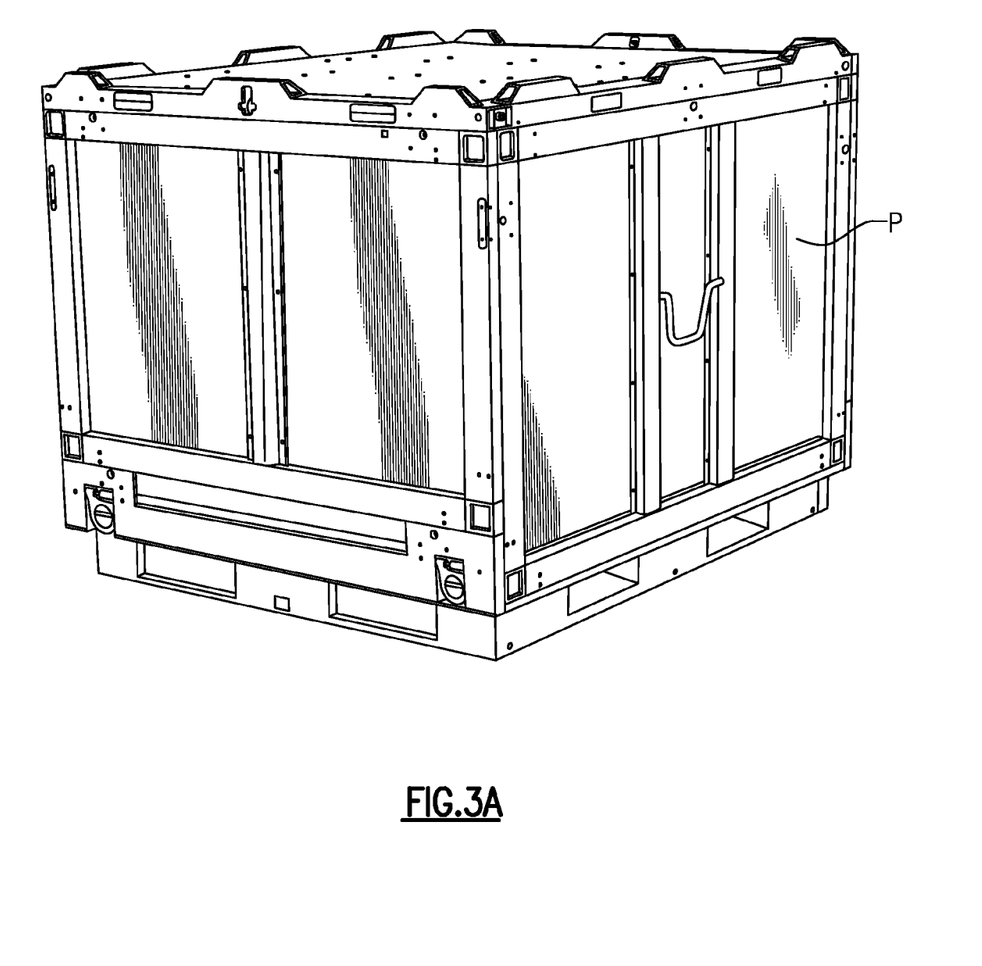
FIG. 3A is a perspective view of a payload container.

The cargo tunnel 30 provides an external conformal interface sized to receive a payload container P (FIG. 3A). The payload container may be a standardized Joint Modular Intermodal Container (JMIC). The JMIC is a stackable, interlocking reusable pallet/crate hybrid designed for use in asset-based packaging logistics operations. The JMIC is 52×44×42 inches in size. The cargo tunnel 30 is sized to receive one JMIC to provide an external conformal interface in the disclosed embodiment, however, aircraft of other sizes may alternatively be sized to receive a multiple of payload containers or a payload container of a different size.

Figure 3B:
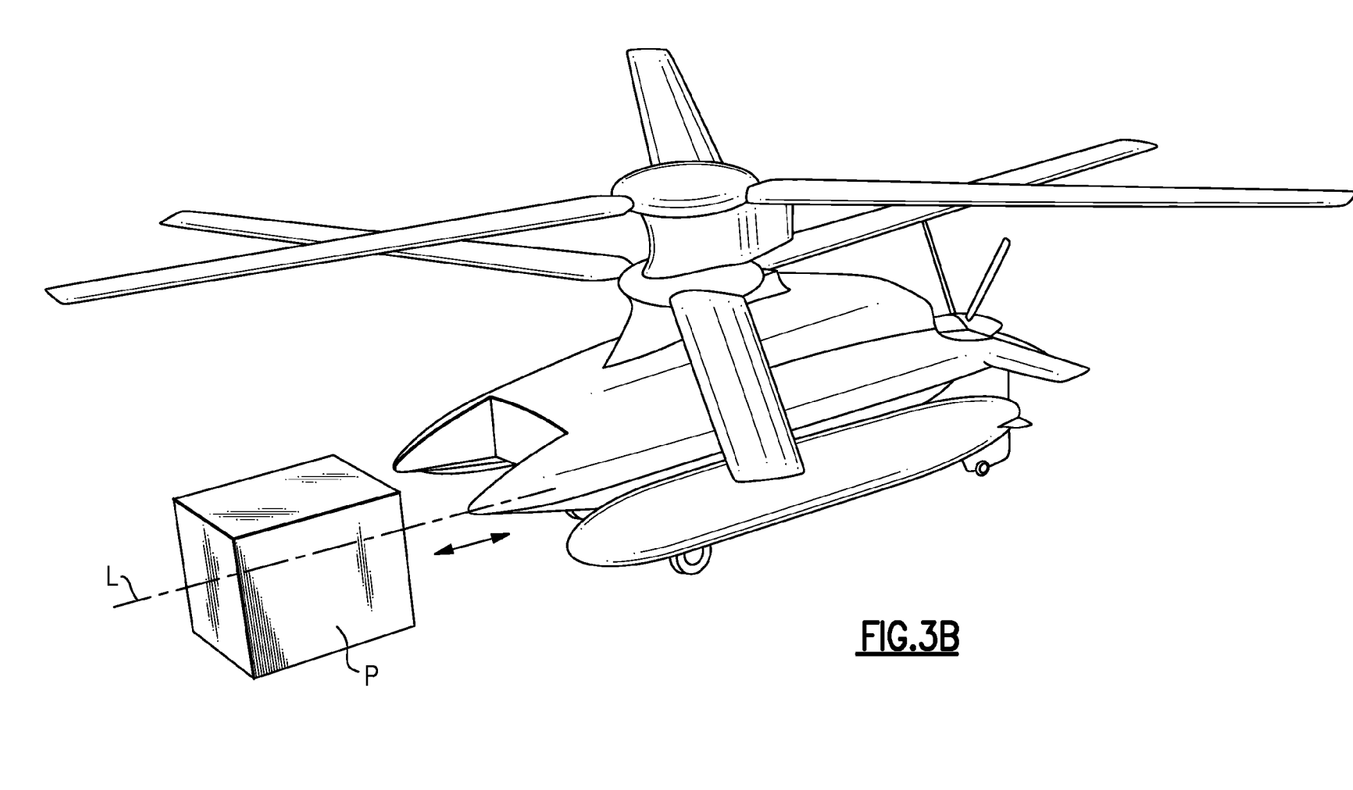
FIG. 3B is a perspective view of a VTOL UAV illustrating the loading of a payload container along a longitudinal axis.
Figure 3C:
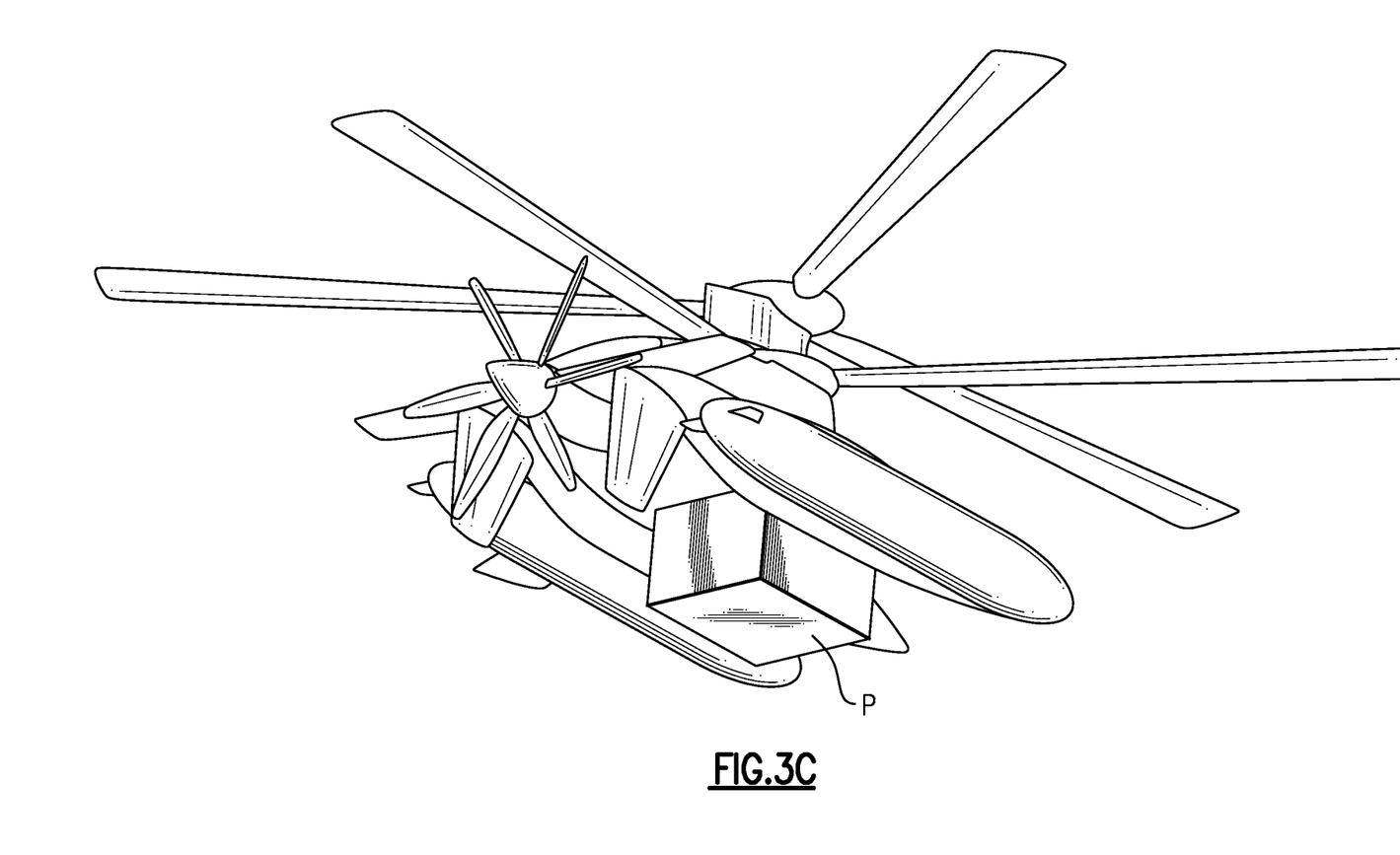
FIG. 3C is a bottom rear aspect perspective view of a VTOL UAV with a payload container in an attached position.
Figure 3D:
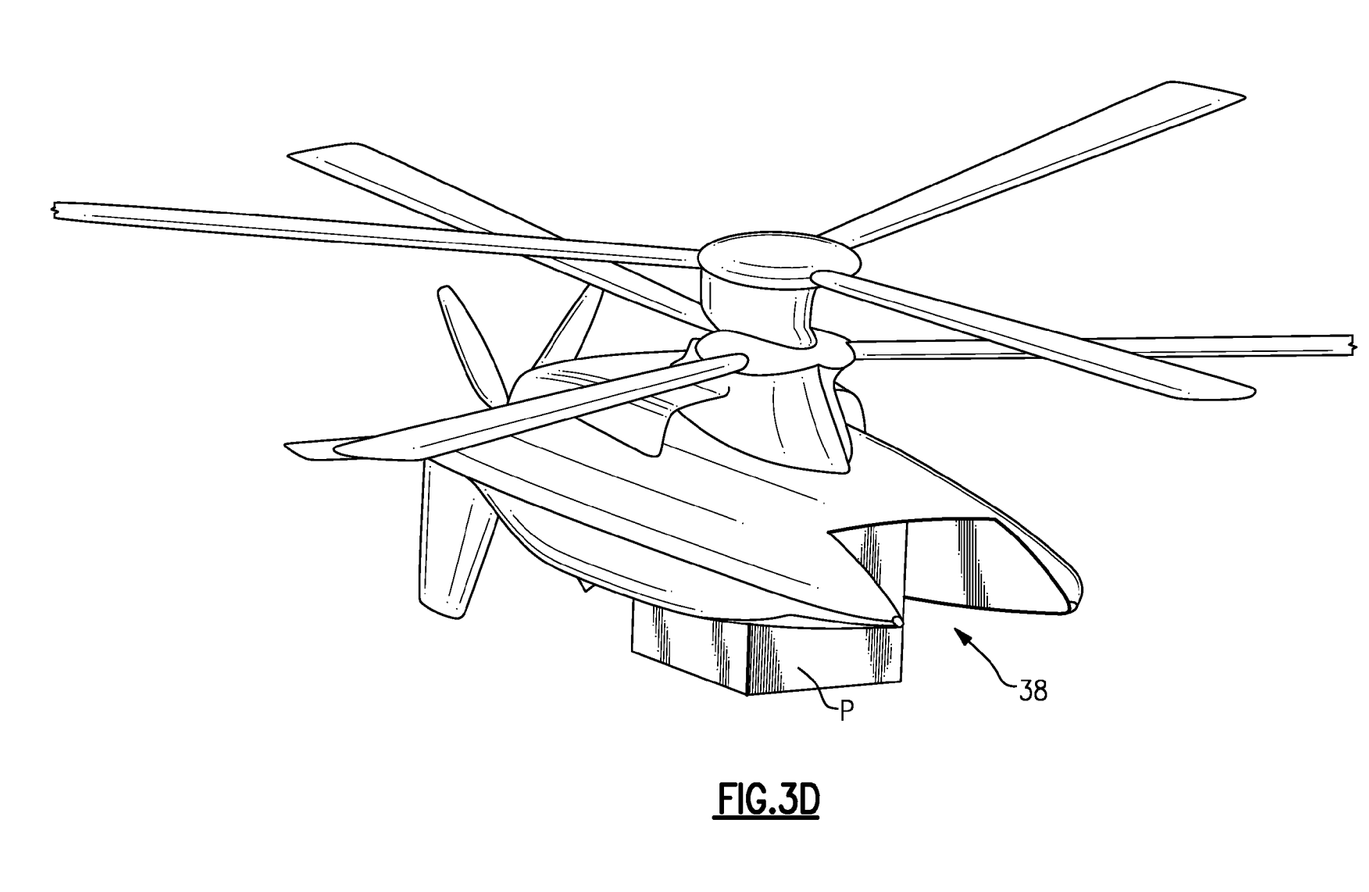
FIG. 3D is an upper front aspect perspective view of a VTOL UAV with a payload container in an attached position.

The open forward cargo tunnel section 38 opens through a forward section 14A of the airframe 14 such that the payload container P may transit along the longitudinal axis L of the airframe 12 for loading therein (FIGS. 3B-3D). The first tunnel surface 32 defines the upper surface of the cargo tunnel 30 and includes a payload container interface 40 to receive the payload container P. It should be understood that various payload container interfaces 40 such as hooks, locks and other interfaces may be provided to receive the payload container.

Referring to FIG. 2, the airframe 14 second tunnel surface 34 and third tunnel surface 36 are defined in part by a respective starboard sponson 42 and port sponson 44. The starboard sponson 42 and port sponson 44 are aerodynamically contoured to provide conformal support (FIG. 2) for an external fuel tank 50 (illustrated attached in FIGS. 1A-1C and 3B-3D). In the disclosed embodiment, the two external fuel tanks 50 provide greater capacity than the internal fuel capacity to further facilitate the modular mission driven nature of the aircraft.

The starboard sponson 42 and port sponson 44 contain a retractable main landing gear system 52. A tail section 54 includes horizontal stabilizers 46, 48, and vertical stabilizers 56. The vertical stabilizers 56 each include fixed tail gear 58 (best seen in FIG. 1B). The retractable main landing gear system 52 retracts forward to selectively position the airframe 14 and to vertically position the cargo tunnel 30 relative to the payload container P for attachment thereto. That is, the retractable main landing gear system 52 is movable even when the aircraft is on the ground so as to position the cargo tunnel 30 relative to the payload container P.

Figure 4:
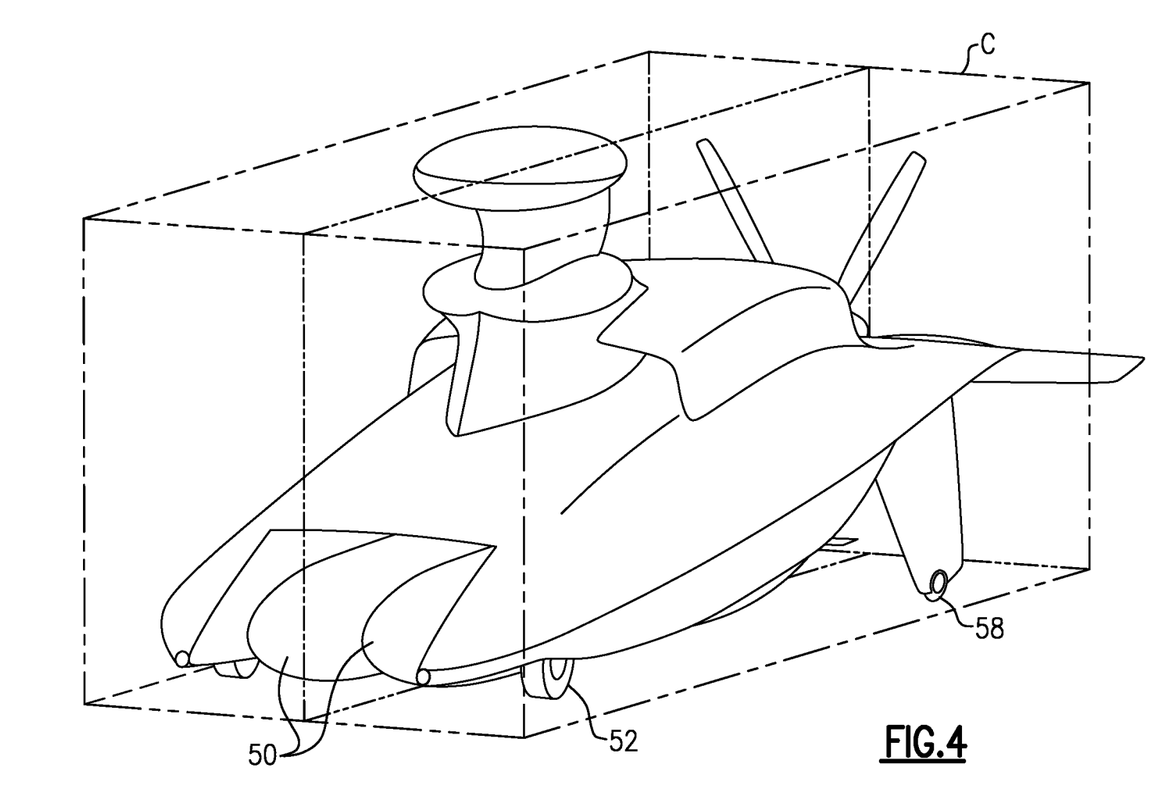
FIG. 4 is a perspective view of a VTOL UAV in a squat position with the rotor blades removed as would be typical of a transport condition.

Forward retraction of the retractable main landing gear system 52 also allows the aircraft to squat for transport within a compact cubic space C (FIG. 4). Removal of the rotor blades and location of the external fuel tanks 50 within the cargo tunnel 30 further facilitates the transportable nature of the aircraft. It should be understood that various foldable or removable structures may alternatively or additionally be provided to further provide compact transport.

Figure 5A:
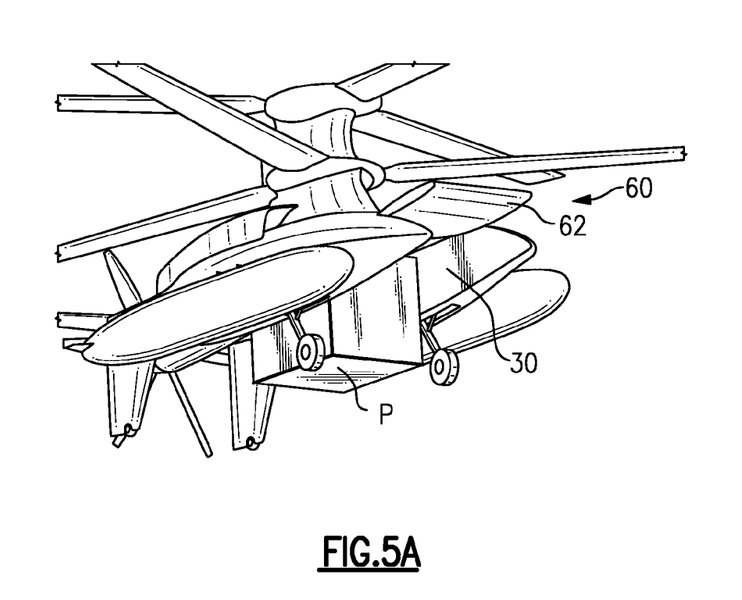
FIG. 5A is a frontal aspect lower perspective view illustrating an aerodynamic structure in a retracted position.
Figure 5B:
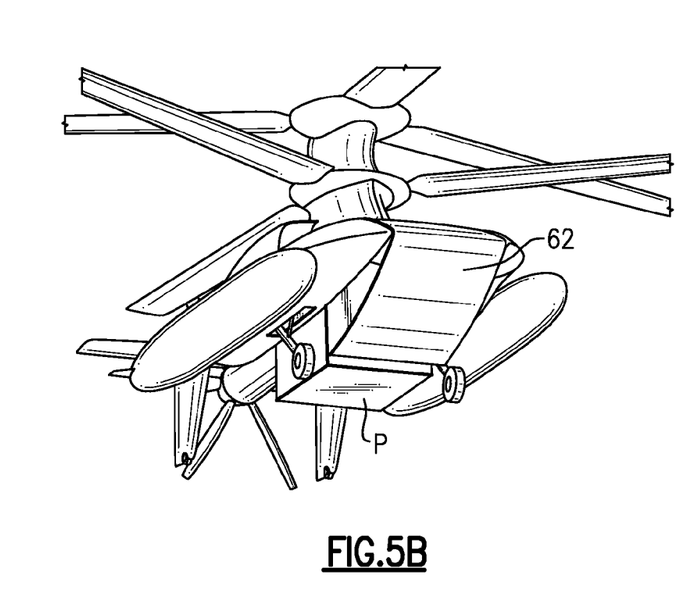
FIG. 5B is a frontal aspect lower perspective view illustrating the aerodynamic structure of FIG. 5A in a deployed position.

Referring to FIG. 5A, the aircraft 10 also incorporates a movable aerodynamic structure 60 which provides an aerodynamic interface between the cargo tunnel 30 and the payload container P. The aerodynamic structure 60 deploys to provide drag reduction through payload form factor tailoring. The aerodynamic structure 60 may include a secondary aerodynamic structure 62 which articulates between a load position (FIG. 5A) and a flight position (FIG. 5B). It should be understood that the aerodynamic structure 60 may move through various articulated positions to accommodate various payloads. The aerodynamic structure is located forward and aft of the payload container P.

Figure 6A:
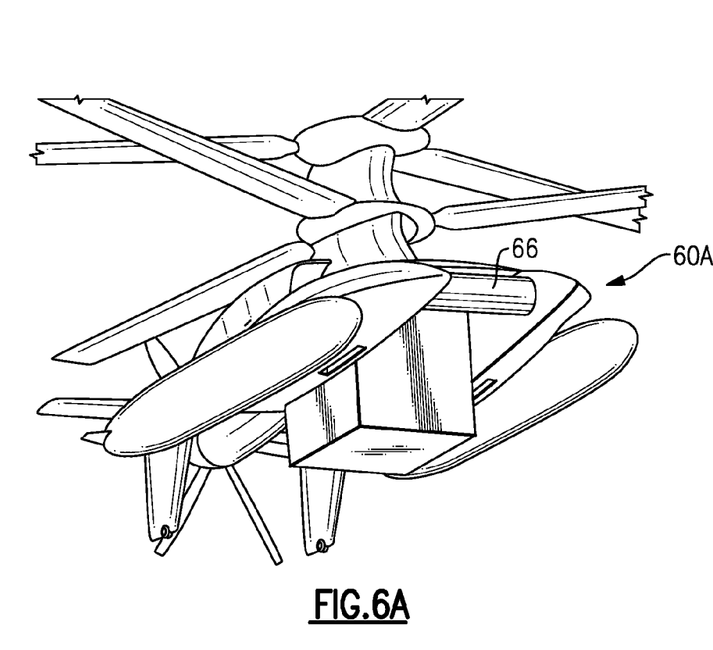
FIG. 6A is a frontal aspect lower perspective view illustrating another aerodynamic structure in a retracted position.
Figure 6B:
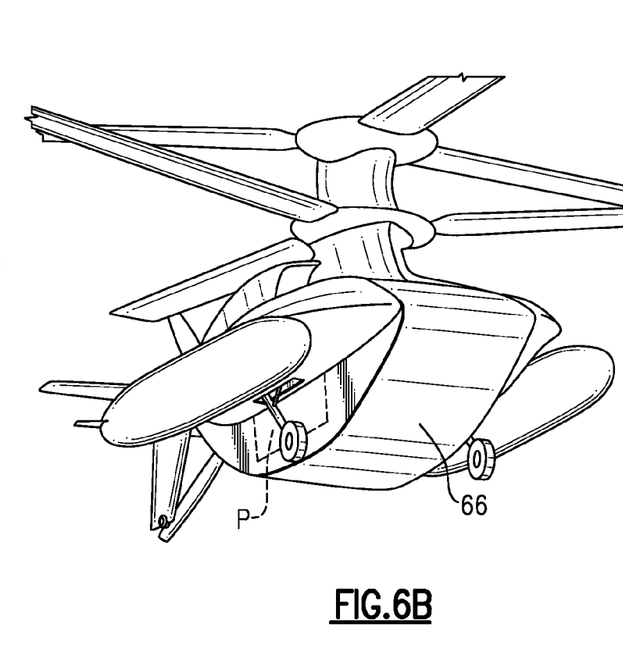
FIG. 6B is a frontal aspect lower perspective view illustrating the aerodynamic structure of FIG. 6A in a deployed position.

Referring to FIG. 6A, the aerodynamic structure 60A may alternatively include an aerodynamic tarp 66 which selectively deploys at least partially around the payload container P (FIG. 5B). That is, the aerodynamic tarp 66 unrolls over the payload container P to provide an aerodynamic surface to surround the rectilinear payload container P.

Figure 7A:
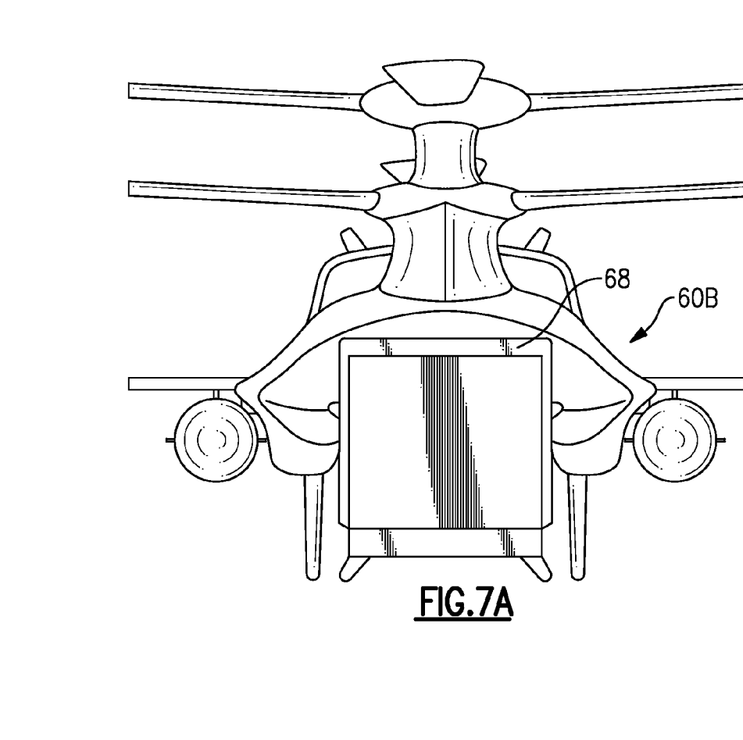
FIG. 7A is a frontal aspect lower perspective view illustrating another aerodynamic structure in a retracted position.
Figure 7B:
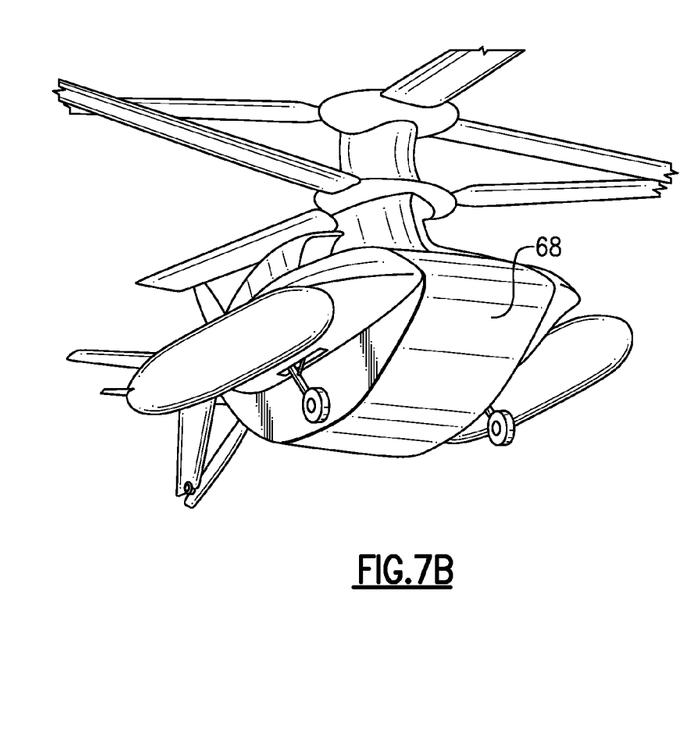
FIG. 7B is a frontal aspect lower perspective view illustrating the aerodynamic structure of FIG. 7A in a deployed position.

Referring to FIG. 7A, the aerodynamic structure 60B may alternatively include a smart structure 68 which changes shape (FIG. 7B) to provide an aerodynamic interface to the rectilinear payload container P.

Figure 8A:
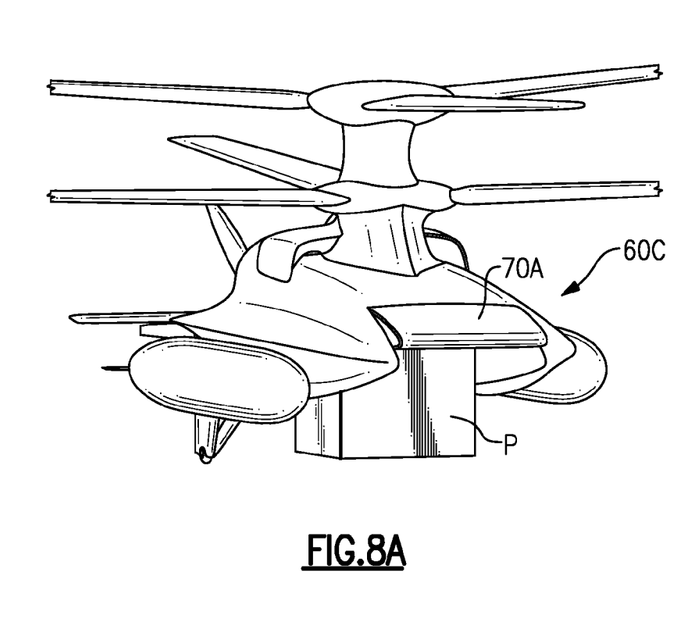
FIG. 8A is a frontal aspect lower perspective view illustrating another aerodynamic structure in a retracted position.
Figure 8B:
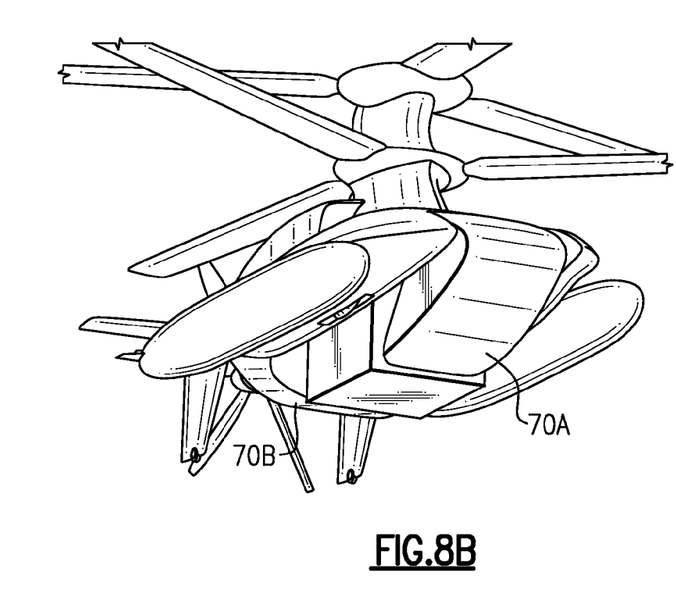
FIG. 8B is a frontal aspect lower perspective view illustrating the aerodynamic structure of FIG. 8A in a deployed position.

Referring to FIG. 8A, the aerodynamic structure 60C may alternatively include a pneumatic inflatable structure 70A, 70B which are selectively inflated (FIG. 8B) to provide an aerodynamic surface about the rectilinear payload container P. It should be understood that other deployable aerodynamic structure may alternatively or additionally be provided.

Figure 9:
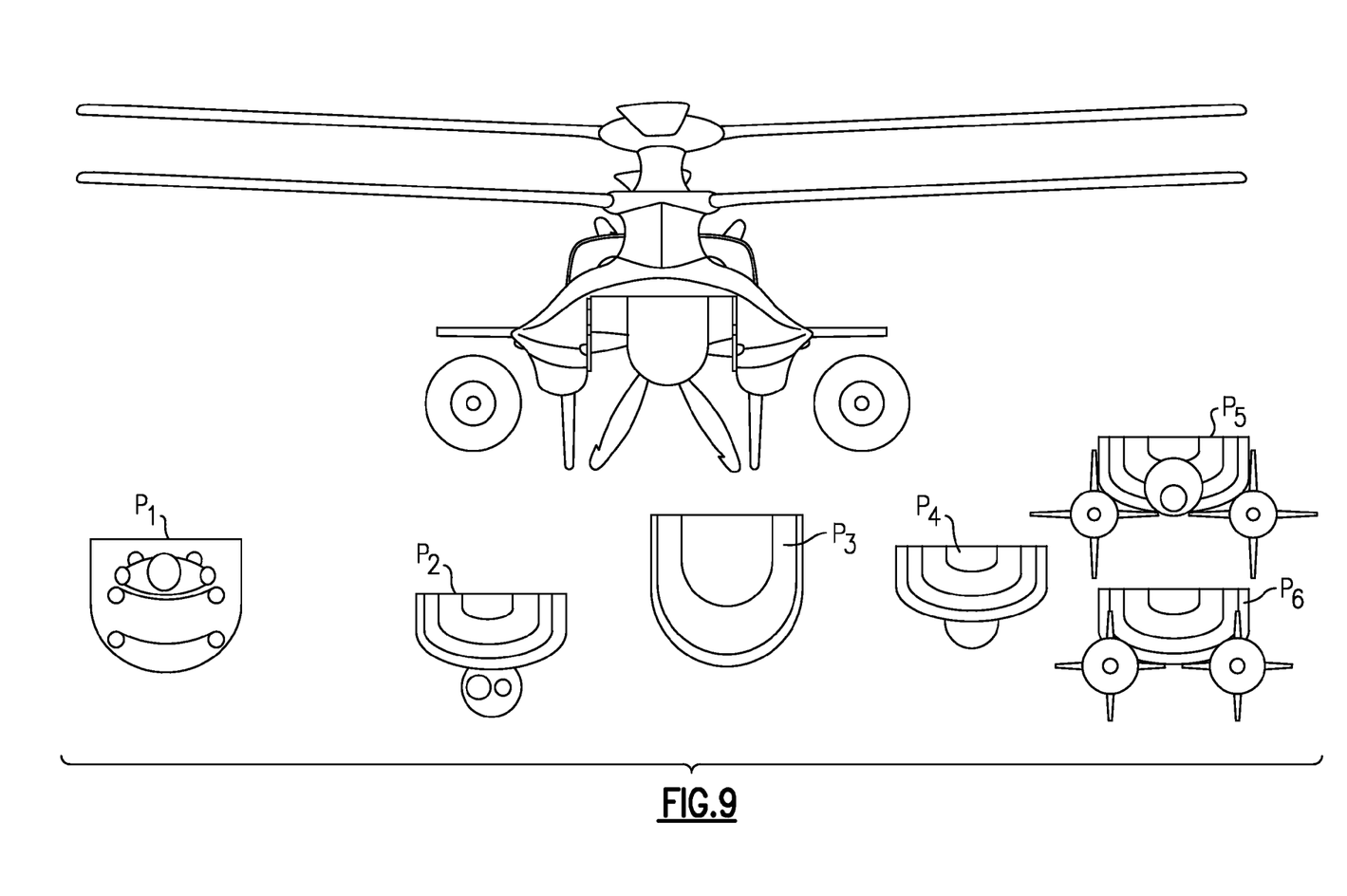
FIG. 9 is a front view of a VTOL UAV illustrating a multiple of payload containers tailored to specific missions.

There is an increased emphasis on the use of unmanned air vehicles (UAV) for performing various activities in both civilian and military situations where the use of manned flight vehicles may not be appropriate. In addition to autonomous cargo delivery, UAV missions may include surveillance, reconnaissance, target acquisition, target designation, data acquisition, communications relay, decoy, jamming, harassment, ordinance delivery, and many others. The aircraft 14 may therefore receive mission specific payload Containers P1-P6 (FIG. 9) to perform any such mission.

In operation, the aircraft 10 of the disclosed embodiment is a VTOL UAV that autonomously engages and disengages the payload container P which thereby permits, for example, the transport of payload containers into hostile environments with minimum human intervention. In one scenario, such as pre-positioning of material, the aircraft 10 transports and drops-off the payload container to a desired destination such that when personnel later arrive, the payload container(s) will already be waiting. In another scenario, such as re-supply during a firefight, the payload container is released from the aircraft autonomously at a desired site such that focus will remain on the fight and removal of the payload container contents can occur when time or circumstances permit. In still another scenario such as a medical evacuation, the position of a payload container is transmitted to an aircraft 10 which autonomously lands adjacent he payload container, taxies over the payload container; adjust the aircraft main landing gear height to receive the payload container within the cargo tunnel; then egresses from the area of operations.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vertical takeoff and landing (VTOL) aircraft comprising:
   an airframe which defines a cargo tunnel along a longitudinal axis of said airframe, said cargo tunnel interfaces with a first surface of a payload container and extends at least partially along a second side and a third side of the payload container, wherein said cargo tunnel has an axial length that is longer than a length of the payload container,
   a landing gear system that retracts to selectively vertically position the cargo tunnel relative to the payload container when said landing gear system is in contact with ground.

2. The aircraft as recited in claim 1, wherein said aircraft is unmanned.

3. The aircraft as recited in claim 1, wherein the first surface is an upper surface of the payload container.

4. The aircraft as recited in claim 1, wherein said cargo tunnel includes an open forward cargo tunnel section which opens through a forward section of said airframe such that the payload container may transit along a longitudinal axis of the airframe through said open forward cargo tunnel section.

5. The aircraft as recited in claim 1, wherein said cargo tunnel includes an at least partially closed aft section.

6. The aircraft as recited in claim 5, wherein said aft section includes a propulsive system.

7. The aircraft as recited in claim 1, wherein said cargo tunnel includes a first tunnel surface, a second tunnel surface transverse to said first tunnel surface and a third tunnel surface transverse to said first tunnel surface.

8. The aircraft as recited in claim 7, wherein said cargo tunnel includes an open forward cargo tunnel section which opens through a forward section of said airframe such that the payload container may transit along a longitudinal axis of the airframe through said open forward cargo tunnel section.

9. The aircraft as recited in claim 7, wherein said second tunnel surface and said third tunnel surface are defined by respective port and starboard sponsons of said airframe.

10. The aircraft as recited in claim 9, wherein said port and starboard sponsons of said airframe are each operable to support an external fuel tank.

11. The aircraft as recited in claim 1, wherein said airframe includes a propulsive system.

12. The aircraft as recited in claim 11, wherein said cargo tunnel has an open bottom and the payload container received within said cargo tunnel has a downwardly facing surface detached from any portion of said aircraft.

13. The aircraft as recited in claim 1, wherein said airframe includes a dual, counter-rotating, coaxial rotor system having an axis of rotation that intersects the payload container, each rotor system of said dual, counter-rotating, coaxial rotor system having a plurality of blades.

14. The aircraft as recited in claim 1, wherein said cargo tunnel has an open bottom, such that the payload container received within said cargo tunnel has a downwardly facing surface that is completely exposed.

15. The aircraft as recited in claim 1, including an aerodynamic structure to define an aerodynamic interface forward of the payload container, said aerodynamic structure moveable about a generally horizontal axis.

16. The aircraft as recited in claim 1, wherein said landing gear system is configured to retract forward.

17. A vertical takeoff and landing (VTOL) aircraft comprising:
   an airframe which defines a cargo tunnel along a longitudinal axis of said airframe, said cargo tunnel interfaces with a first surface of a payload container and extends at least partially along a second side and a third side of the payload container; and
   a dual, counter-rotating, coaxial rotor system which defines an axis of rotation, said axis of rotation intersects said first surface of the payload container when the payload container is held within said cargo tunnel
   a landing gear system selectively positionable relative to said airframe when contacting ground to vertically position said cargo tunnel relative to the payload container to attach said upper surface to said payload container when said aircraft is on the ground.

18. The aircraft as recited in claim 17, wherein said aircraft is unmanned.

19. The aircraft as recited in claim 17, wherein the first surface is an upper surface of the payload container, and said cargo tunnel has an axial length that is longer than a length of the payload container.

20. The aircraft as recited in claim 17, wherein said cargo tunnel includes an open forward cargo tunnel section which opens through a forward section of said airframe such that the payload container may transit along a longitudinal axis of the airframe through said open forward cargo tunnel section.

21. The aircraft as recited in claim 17, wherein said cargo tunnel includes an at least partially closed aft section, said aft section includes a propulsive system operable to provide translational thrust.

22. The aircraft as recited in claim 17, wherein said cargo tunnel includes a first tunnel surface, a second tunnel surface transverse to said first tunnel surface and a third tunnel surface transverse to said first tunnel surface, said cargo tunnel includes an open forward cargo tunnel section which opens through a forward section of said airframe such that the payload container may transit along a longitudinal axis of the airframe through said open forward cargo tunnel section.

23. The aircraft as recited in claim 17, wherein said cargo tunnel includes a first tunnel surface, a second tunnel surface transverse to said first tunnel surface and a third tunnel surface transverse to said first tunnel surface, said second tunnel surface and said third tunnel surface are defined by respective port and starboard sponsons of said airframe said first tunnel surface defined by a vertically upper surface of said cargo tunnel.

24. The aircraft as recited in claim 23, wherein said port and starboard sponsons of said airframe are each operable to support an external fuel tank.

25. The aircraft as recited in claim 17, wherein said cargo tunnel provides at least partial conformal carriage of the payload container.

26. The aircraft as recited in claim 17, further comprising an aerodynamic structure to define an aerodynamic interface forward of the payload container, said aerodynamic structure moveable about a generally horizontal axis.

27. The aircraft as recited in claim 17, wherein each rotor of said dual, counter-rotating, coaxial rotor system includes more than two blades.

28. The aircraft as recited in claim 17, wherein said landing gear system is configured to retract forward to selectively position said landing gear system relative to said airframe.

29. A vertical takeoff and landing (VTOL) aircraft comprising:

an airframe which defines a cargo tunnel along a longitudinal axis of said airframe, said cargo tunnel interfaces with a first surface of a payload container and extends at least partially along a second side and a third side of the payload container; and an aerodynamic structure forward of the payload container to define an aerodynamic interface forward of the payload container, wherein said cargo tunnel has an axial length that is longer than a length of the payload container a landing gear system that is retractable when said aircraft is on ground to selectively position the cargo tunnel vertically when said aircraft is on ground.

30. The aircraft as recited in claim 29, further comprising a dual, counter-rotating, coaxial rotor system which defines an axis of rotation, said axis of rotation intersects the payload container, each rotor system of said dual, counter-rotating, coaxial rotor system having a plurality of blades.

31. The aircraft as recited in claim 29, wherein said aircraft is unmanned.

32. The aircraft as recited in claim 29, wherein said cargo tunnel provides at least partial conformal carriage of the payload container.

33. The aircraft as recited in claim 29, wherein said cargo tunnel has an open bottom and the payload container received within said cargo tunnel has a downwardly facing surface detached from any portion of said aircraft.

34. The aircraft as recited in claim 29, wherein said landing gear system is configured to retract forward to position the cargo tunnel.

\* \* \* \* \*